United States Patent
Patwardhan et al.

(10) Patent No.: US 10,165,598 B2
(45) Date of Patent: Dec. 25, 2018

(54) WIRELESS MEDIUM CLEARING

(71) Applicant: Aruba Networks, Inc., Sunnyvale, CA (US)

(72) Inventors: Gaurav Patwardhan, Sunnyvale, CA (US); Shahnawaz Siraj, Sunnyvale, CA (US); Sachin Ganu, Sunnyvale, CA (US)

(73) Assignee: Aruba Networks, Inc., Sunnyvale, CA (US)

( * ) Notice: Subject to any disclaimer, the term of this patent is extended or adjusted under 35 U.S.C. 154(b) by 10 days.

(21) Appl. No.: 15/379,408

(22) Filed: Dec. 14, 2016

(65) Prior Publication Data

US 2018/0167975 A1     Jun. 14, 2018

(51) Int. Cl.
| | | |
|---|---|---|
| *G01R 31/08* | (2006.01) | |
| *H04W 74/08* | (2009.01) | |
| *H04W 74/00* | (2009.01) | |
| *H04L 12/853* | (2013.01) | |
| *H04L 12/851* | (2013.01) | |
| *H04L 12/413* | (2006.01) | |
| *H04W 28/26* | (2009.01) | |
| *H04W 84/18* | (2009.01) | |

(52) U.S. Cl.
CPC ..... *H04W 74/0816* (2013.01); *H04L 47/2416* (2013.01); *H04L 47/2441* (2013.01); *H04W 74/004* (2013.01); *H04W 74/006* (2013.01); *H04L 12/413* (2013.01); *H04W 28/26* (2013.01); *H04W 84/18* (2013.01)

(58) Field of Classification Search
CPC ................................................. H04W 74/0816
See application file for complete search history.

(56) References Cited

U.S. PATENT DOCUMENTS

| | | | | |
|---|---|---|---|---|
| 8,411,612 | B2* | 4/2013 | Lee | H04W 72/1257 370/315 |
| 8,837,513 | B2* | 9/2014 | Kholaif | H04W 74/085 370/445 |
| 8,909,286 | B2 | 12/2014 | Grandhi et al. | |
| 9,345,026 | B2 | 5/2016 | Abraham et al. | |
| 9,451,637 | B2* | 9/2016 | Kim | H04W 74/06 |
| 2008/0144506 | A1* | 6/2008 | Kanda | G08C 15/00 370/235 |
| 2012/0020269 | A1* | 1/2012 | Gong | H04W 74/0816 370/312 |

(Continued)

FOREIGN PATENT DOCUMENTS

| | | |
|---|---|---|
| WO | WO-2006133414 | 12/2006 |
| WO | WO-2008111496 | 9/2008 |

OTHER PUBLICATIONS

Chousidis, C. et al.; "Expanding the Use of CTS-to-self Mechanism for Reliable Broadcasting on IEEE 802.11 Networks"; Aug. 2014; 7 pages.

*Primary Examiner* — Gerald A Smarth
(74) *Attorney, Agent, or Firm* — Hewlett Packard Enterprise Patent Department

(57) ABSTRACT

In some examples, a method can include transmitting, with an Access Point (AP), Request to Send (RTS) frames to a wireless client over a wireless medium; determining, with the AP, whether the medium is reserved by failed RTS frames for the client; and transmitting, with the AP, a frame to clear the medium when it is determined that the medium is reserved by failed RTS frames for the client.

20 Claims, 5 Drawing Sheets

(56) References Cited

U.S. PATENT DOCUMENTS

| | | |
|---|---|---|
| 2012/0044844 A1 | 2/2012 | Trainin |
| 2013/0268654 A1 | 10/2013 | Abraham et al. |
| 2015/0063251 A1 | 3/2015 | Asterjadhi |
| 2017/0238310 A1* | 8/2017 | Huang .................... H04L 43/16 370/329 |
| 2018/0020428 A1* | 1/2018 | Madhavan .............. H04W 8/22 |

* cited by examiner

WIRELESS MEDIUM CLEARING

BACKGROUND

Wireless networking can allow wireless devices, such as certain smartphones, laptops, tablets, or other suitable computing devices, to exchange data with other wired or wireless devices. In some wireless networks, a wireless device can access a wired portion of the network via one or more access points. Such access points can, for example, be programmed to communicate with wireless devices using certain transmission settings based on capabilities of network equipment or other factors.

DETAILED DESCRIPTION

Figure 1:
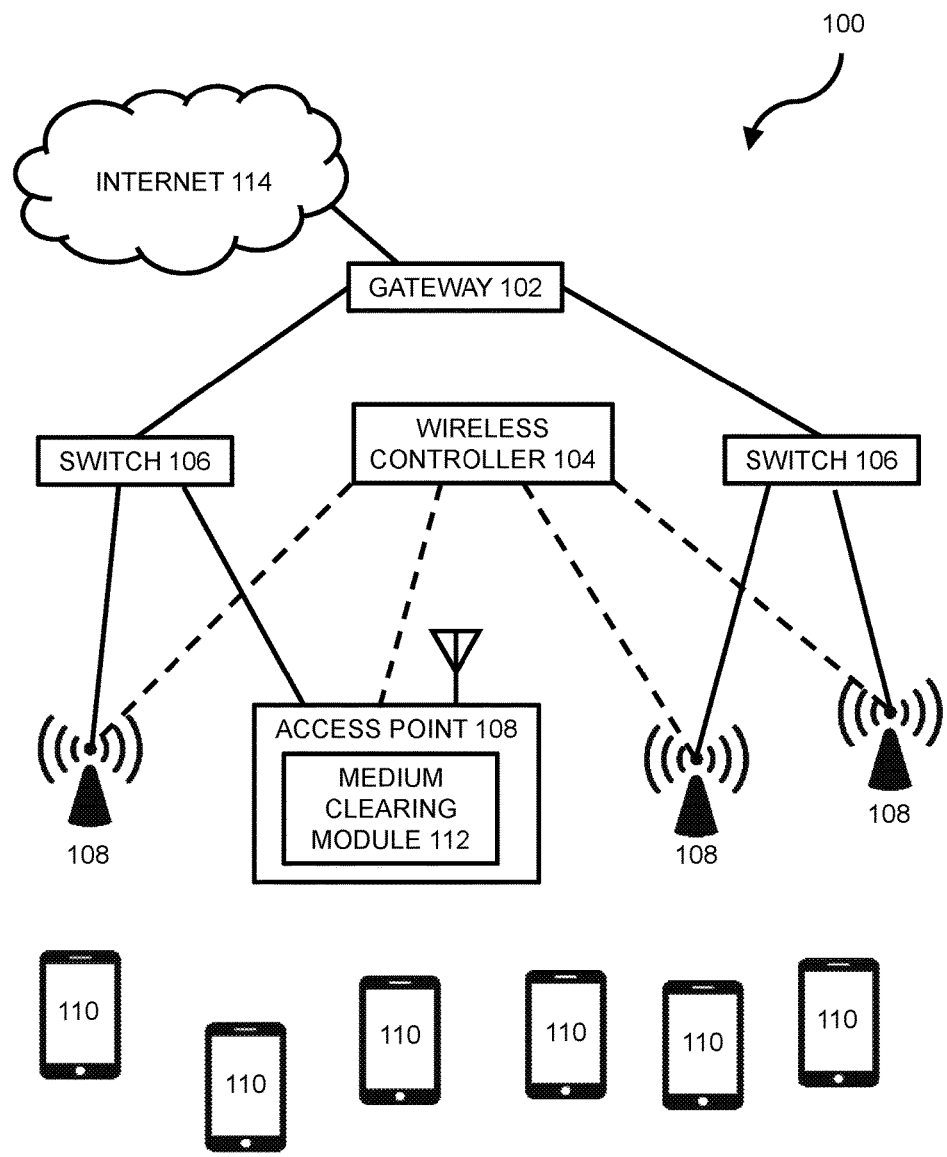
FIG. 1 is a diagram of a network environment including an access point with a medium clearing module, according to an example.

The following discussion is directed to various examples of the disclosure. Although one or more of these examples may be preferred, the examples disclosed herein should not be interpreted, or otherwise used, as limiting the scope of the disclosure, including the claims. In addition, the following description has broad application, and the discussion of any example is meant only to be descriptive of that example, and not intended to intimate that the scope of the disclosure, including the claims, is limited to that example. Throughout the present disclosure, the terms "a" and "an" are intended to denote at least one of a particular element. In addition, as used herein, the term "includes" means includes but not limited to, the term "including" means including but not limited to. The term "based on" means based at least in part on.

Certain wireless networking environments may suffer from issues related to "hidden nodes." Hidden nodes may occur when a wireless node is visible to a wireless access point (AP), but not visible to other nodes communicating with that AP. For example, suppose a wireless network includes an AP and several wireless clients (e.g., first node A, second node B, third node C, fourth node D, etc.) surrounding the AP and within communication range of the AP. In this example, although each node is within wireless communication range of the AP, certain nodes may not be within wireless communication range of each other and may therefore be unable to wireless communicate with each other. In this example, such nodes may be considered to be "hidden" with respect to each other. If hidden nodes simultaneously send packets to the AP, the nodes may be unable to detect a collision while transmitting, which may result in corrupt data being received by the AP or other issues. To help circumvent hidden nodes, APs may rely on Request-to-Send (RTS) and Clear-to-Send (CTS) frames along with Network Allocation Vectors (NAV) to assist with collision avoidance.

In some wireless network environments, certain nodes may receive low throughput because to an AP repeatedly sends RTS frames to a node that is scanning off-channel or is unavailable in some other way. In some situations, the AP may continue to send RTS frames to the node to reserve the medium until it eventually receives a response from the node or times out. This may result in inefficient use of the medium and may be especially prevalent when there is a single AP that is associated with nodes having different wireless Network Interface Cards (NICs), Operating Systems (OS's), and/or installed driver versions. In such environments, the likelihood may be higher that any one node may be non-responsive to RTS frames sent by the AP.

In some implementations of the present disclosure, an AP is instructed to transmit CTS-to-self, Contention Free (CF)-end, or other suitable frames in order to clear up NAV vectors set by the RTS frames when a node is not responding to RTS frames from the AP. In some implementations, a method can include: (a) transmitting, with an AP, RTS frames to a wireless client over a wireless medium; (b) determining, with the AP, whether the medium is reserved by failed RTS frames for the client; and (c) transmitting, with the AP, a frame to clear the medium when it is determined that the medium is reserved by failed RTS frames for the client. In some implementations, the frame to clear the medium may be selectively transmitted based on a Quality of Service (QoS) of a frame queued to be sent to a non-responsive node. In such an example, frames that are delay sensitive (certain voice and video frames in some examples) may be re-tried until sent, while frames that are not delay sensitive or less delay sensitive (certain best effort and background frames in some examples) may result in the AP sending a frame to clear the medium if the node does not respond. Certain implementations of the present disclosure may allow for higher AP throughput as well as greater efficiency of the wireless medium. Other advantages of implementations presented herein will be apparent upon review of the description and figures.

FIG. 1 is a diagram of an example network environment 100 that includes a local area network portion including a gateway 102, a wireless controller 104, various switches 106, various APs 108, and various wireless clients 110. In environment 100 of FIG. 1, AP 108 includes a medium clearing module 112 as described in further detail below. The structure and functionality of the various aspects of environment 100 are described in further detail below.

The terms "access point" or "AP" as used herein, can, for example, refer to networking hardware device that allows a Wi-Fi compliant device to connect to a wired network. Such an AP 108 may be connected to an upstream wired device, such as switch 106, wireless controller 104, etc., via an Ethernet connection and may provide one or more downstream wireless connections using Radio Frequency (RF) links for other wireless clients to use a wired connection. AP 108 can support one or more industry standards for sending and receiving data using these radio frequencies, such as the Institute of Electrical and Electronics Engineers (IEEE) 802.11 standard or other suitable standards. AP 108 can, for example, be in the form of a standalone device connected to a gateway (e.g., gateway 102), router, or other intermediate datapath device. In some implementations, AP 108 may be an integral component of such an intermediate datapath device or other network equipment. The term "access point" or "AP" as used herein may generally refer to receiving points for any known or convenient wireless access technology which may later become known. Specifically, the term AP is not intended to be limited to IEEE 802.11-based APs. APs generally function as an electronic device that is adapted to allow wireless devices to connect to a wired network via various communications standards.

As used herein, the term "wireless controller" can, for example, refer to any suitable entity that handles control and management functions of a network or equipment thereof. For example, wireless controller 104 can be used to control one or more aspects of APs 108, such as channel assignment, beamforming, radio resource management (RRM), etc. In some implementations, applications can run on wireless controller 104 or on other devices on the network (or otherwise in communication with the network) to meet customer use cases, such as to achieve a desired throughput (or another Quality of Service (QoS)) over the network, enforce security provisions or access control policies for the network, or provide another suitable service or functionality.

In some implementations, wireless controller 104 can allow for the decoupling of traffic routing control decisions (e.g., which port of a given switch should be used to forward traffic to a given destination) from the network's physical infrastructure. For example, in some implementations, wireless controller 104 can be in the form of an SDN controller and switches 106 can be in the form of SDN-enabled switches that are within the control domain of the SDN controller. In some environments, one or more network nodes within environment 100 may be deemed to be "controlled" by another device, such as wireless controller 104.

As used herein, the term "network nodes" can refer to physical or virtual devices adapted to transmit and/or receive signaling and to process information within such signaling such as a station (e.g., any data processing equipment such as a computer, cellular phone, personal digital assistant, tablet devices, etc.), an access point, data transfer devices (such as network switches, routers, controllers, etc.) or the like.

As used herein, the term "controlled" can, for example, refer to devices within the control domain of the wireless controller 104 or otherwise controllable by wireless controller 104. Such a controlled node can, for example, communicate with wireless controller 104 and can allow wireless controller 104 to manage the node in accordance with a protocol. For example, an OpenFlow-compatible switch controlled by a wireless controller 104 with SDN capabilities may permit controller 104 to add, update, and delete flow entries in flow tables of switch 106 using suitable commands.

In some network environments, a data packet may be routed from a given switch 106 to a given wireless client 110 through one or more data paths that may include wireless links (e.g., a wireless link between AP 108 and wireless client 110). For example, in some network environments, a data packet may be routed to wireless client 110 along a first datapath that uses a first AP 108 or alternatively along a second datapath that uses a second AP 108. A given data path for data packets within environment 100 can be determined by wireless controller 104 (or another entity, such as by a network administrator, by datapath nodes themselves, etc.) based on one or more static parameters (e.g., link speeds, number of hops between nodes, etc.) and can further (or alternatively) be based on one or more dynamic parameters (e.g., QoS, network latency, network throughput, network power consumption, etc.).

Network nodes within environment 100 can forward traffic along a datapath based on metadata within the traffic. For example, traffic in the form of a packet can be received at switch 106 (or another suitable intermediary network node). For consistency, the industry term "packet" is used throughout this description, however, it is appreciated that the term "packet" as used herein can refer to any suitable protocol data unit (PDU). Such a packet can, for example, include payload data as well as metadata in the form of control data. Control data can, for example, provide data to assist the network node with reliably delivering payload data. For example, control data can include network addresses for source and destination nodes (e.g., wireless client 110), error detection codes, sequencing information, packet size of the packet, a time-to-live (TTL) value, etc. In contrast, payload data can include data carried on behalf of an application for use by source and destination nodes.

The functionality of wireless controller 104 or other network equipment within environment 100 can, for example, be implemented in part via a software program on a standalone machine, such as a standalone server. In some implementations, wireless controller 104 can be implemented on one or more multi-purpose machines, such as a suitable desktop computer, laptop, tablet, or the like. In some implementations, wireless controller 104 can be implemented on a suitable non-host network node, such as certain types of network switches. In some implementations, the functionality of wireless controller 104 can be implemented within the hardware and software of an AP (e.g., AP 108). It is appreciated that the functionality of wireless controller 104 may be split among multiple controllers or other devices. For example, environment 100 is described and illustrated as including only one wireless controller 104. However, it is appreciated that the disclosure herein can be implemented in networks with multiple controllers. For example, in some networks, network devices are in communication with multiple controllers such that control of the network can be smoothly handed over from a first controller to a second controller if a first controller fails or is otherwise out of operation. In some implementations, or more wireless controllers 104 can operate in a distributed fashion over multiple appliances but present themselves as a single entity to the network.

As another example, multiple controllers 104 can be used to work together to concurrently control certain networks. In such networks, a first controller 104 can, for example, control certain network devices while a second controller 104 can control other network devices. In view of the above, reference in this application to a single wireless controller 104 that controls the operation of network devices in environment 100 is intended to also include such multiple controller configurations (and other suitable multiple controller configurations).

Wireless clients 110 can, for example, be in the form of network hosts or other types of network nodes or devices. Wireless clients 110 are depicted as mobile phones in FIG. 1, however such clients can be in the form of any suitable device that can transmit and receive wireless data with an AP 108. For example, in some implementations, wireless clients 110 can be in the form of suitable mobile phones, tablets, laptops, servers, desktop computers, printers, APs, wireless sensors, beacons, Internet of Things (IoT) devices, etc. In certain implementations, one or more wireless clients 110 can be in the form of a desktop computer including a monitor for presenting information to an operator and a keyboard and mouse for receiving input from an operator and one or more wireless clients 110 can be in the form of smart phones. It is appreciated that wireless clients 110 can be endpoint nodes of environment 100 (such as depicted in FIG. 1), intermediate nodes between endpoint nodes, or positioned at other logical or physical locations within environment 100.

Various intermediary nodes within the network environment can, for example, be in the form of switches (e.g., switches 106) or other multi-port network bridges that process and forward data at the data link layer. In some implementations, one or more of the nodes can be in the form of multilayer switches that operate at multiple layers of the Open Systems Connection (OSI) model (e.g., the data link and network layers). Although the term "switch" is used throughout this description, it is appreciated that this term can refer broadly to other suitable network data forwarding devices. For example, a general purpose computer can include suitable hardware and machine-readable instructions that allow the computer to function as a network switch. It is appreciated that the term "switch" can include other network datapath elements in the form of suitable routers, gateways and other devices that provide switch-like functionality for the network. Gateway 102 can, for example, be in the form of a network node that acts as an entrance to another network, such as Internet 114 or another suitable Wide Area Network (WAN) or Local Area Network (LAN).

The various nodes within network environment 100 are connected via one or more data channels (shown in solid lines), which can, for example be in the form of data cables or wireless data channels. Although a single link (i.e., a single line in FIG. 1) between each network node is illustrated, it is appreciated that each single link may include multiple wires or other wired or wireless data channels. Moreover, FIG. 1 further depict wireless controller 104 as being connected to APs 108 via broken lines, which is intended to illustrate logical control channels between wireless controller 104 and APs 108. However, it is appreciated that wireless controller 104 may be directly connected to only one or a few APs 108, while being indirectly connected to other nodes of the network. For example, wireless controller 104 can be directly connected to a first AP via an Ethernet cable, while being indirectly connected to a second AP (e.g., by relying on the first AP to wireless communicate to the second AP control signals for the second AP or via a wired connection between the first and second APs). In certain implementations, the functionality and/or equipment for wireless controller 104 can reside within Internet 114 or another network.

In the example environment 100 depicted in FIG. 1, the various network nodes are in the form of intermediary nodes (e.g., switches 106, gateway 102, APs 108), a controller node (e.g., wireless controller 104), and host devices (wireless clients 110). It is appreciated however, that the implementations described herein can be used or adapted for networks including more or fewer devices, different types of devices, and different network arrangements. As an example, in some implementations, wireless controller 104 may operate as an intermediary node or a host device. As another example, in some implementations, such as in certain mesh networks, a backhaul of the network may be wireless instead of wired. In such an implementation, an AP 108 may wirelessly relay data to another AP 108 that is connected to the wired backbone, to thereby use a wireless link between two APs as a wireless backhaul.

Figure 2:
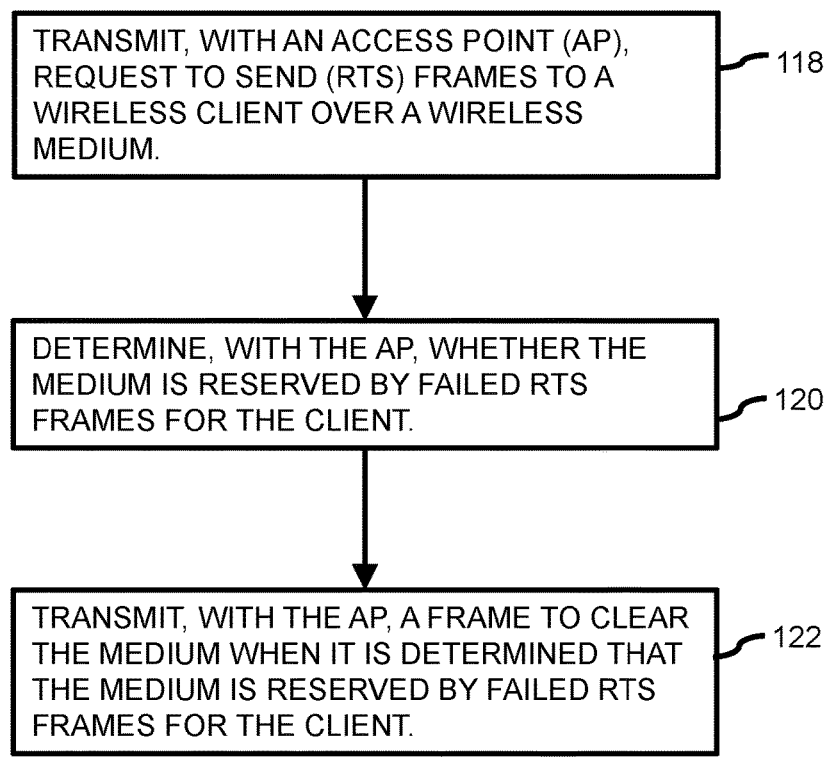
FIG. 2 is a flowchart for a method, according to an example.

FIG. 2 illustrates an example flowchart for an example method 116 related to wireless medium clearing. For illustration, the description of method 116 and its component operations make reference to the example network environment 100 of FIG. 1 and elements thereof, such as example APs 108, wireless clients 110, etc. However, method 116 can be applied to an environment 100 with a different number of APs 108, wireless clients 110, etc.

In some implementations, method 116 can be implemented or otherwise executed through the use of executable instructions stored on a memory resource (e.g., the memory resource of the computing device of FIG. 4), executable machine readable instructions stored on a storage medium (e.g., the medium of FIG. 5), in the form of electronic circuitry (e.g., on an Application-Specific Integrated Circuit (ASIC)), and/or another suitable form. Although the description of method 116 herein primarily refers to operations performed on AP 108 for purposes of illustration, it is appreciated that in some implementations, method 116 can be executed on another computing device within network environment 100 (e.g., wireless controller 104) or in data communication with network environment 100. In some implementations, method 116 can be executed on network devices in parallel (e.g., in a distributed computing fashion).

Method 116 includes transmitting (at block 118), with AP 108, Request to Send (RTS) frames to wireless client 110 over a wireless medium. RTS frames can, for example, refer to a mechanism used by the Institute of Electrical and Electronics Engineers (IEEE) 802.11 wireless networking protocol to reduce frame collisions introduced by the hidden node issue described above. An RTS frame can, for example, contain five fields: (1) Frame Control, (2), Duration, (3) Receiver Address (RA), (4) Transmitter Address (TA), and (5) Frame Check Sequence (FCS). In some implementations, method 116 can include transmitting a Clear to Send (CTS) frame to wireless client 110 over a wireless medium.

As used herein, the term "wireless medium" can, for example, refer to any suitable unguided media by which a signal transmission path is achieved using an antenna, such as air, vacuum, and certain water mediums. The term "unguided" as used herein can refer to the transmission of data without the use of physical means to define the path it takes. That is, unguided media provide a means for transmitting electromagnetic waves but do not guide them.

As used herein, the term "frame" can, for example, refer to a digital data transmission unit in computer networking and telecommunication. Such a frame can, for example, include frame synchronization features including a sequence of bits or symbols that indicate to the receiver the beginning and end of the payload data within the stream of symbols or bits it receives. In the Open Systems Interconnection (OSI) model of computer networking, a frame can be considered a protocol data unit at the data link layer, with each frame being separated from the next by an interframe gap. It is appreciated that the term "frame" may broadly refer to another suitable protocol data unit used in accordance with certain implementations of the present disclosure. For example, in some implementations, aspects of the present disclosure may be applied to a suitable protocol data unit in the form of a packet rather than a frame.

Method 116 includes determining (at block 120) with AP 108, whether the medium is reserved by failed RTS frames for client 110. For example, in some implementations, the medium can be determined to be reserved by repeated failed RTS frames because client 110 does not respond to multiple consecutive RTS frames. In some implementations, the number of consecutive RTS frames that may trigger the determination of block 120 may be 4, 8, or any other suitable number.

It is appreciated that for purposes of the present disclosure the medium may be "reserved" even if the entire channel is not reserved. As used herein, whether the medium is reserved may broadly refer to whether a relevant aspect of the medium is reserved by the RTS frame, such as for example a resource unit of the medium. That is, a NAV may allow a node to indicate the amount of time for transmitting a predetermined frame following a current frame. The medium may be considered reserved for such predetermined frames. The predetermined frames can, for example, be related to operation of the IEEE 802.11 protocol, and can, for example, be in the form of control frames. Such control frames can, for example, include IEEE 802.11 acknowledgements, subsequent data and acknowledgement frames as part of a fragment burst, and data and acknowledgement frames following an RTS/CTS exchange.

It is appreciated that there may be several reasons why the medium is reserved by failed RTS frames. For example, in some implementations, the medium is reserved by failed RTS frames for the client due to client 110 being non-responsive (e.g., within a predetermined period of time or number of failed consecutive RTS frames). In some implementations, client 110 is non-responsive because it is scanning off-channel or turned off partially or entirely.

Method 116 includes transmitting (at block 122), with AP 108, a frame to clear the medium when it is determined that the medium is reserved by failed RTS frames for client 110. In some implementations, the frame to clear the medium is a frame to clear a Network Allocation Vector (NAV) set by the client to reserve the medium. Such a frame can, for example, be a CTS-to-self frame with a minimum duration. In some implementations, the minimum duration is 0. In some implementations, the frame to clear the medium is a Contention Free (CF)-End frame. In some implementations, block 122 may free up the medium reserved by failed RTS frames because of a non-responsive client so that the other neighboring STAs could use the medium which otherwise would not be used because they would have updated their NAV based on failed RTS frames.

It is appreciated that one or more operations of method 116 can be performed periodically. For example, in some implementations, one or more of blocks 118, 120, and 122 (or other operations described herein) may be performed periodically. The various period times for blocks 118, 120, and 122 (or other operations described herein) may be the same or different times. For example, in some implementations, the period of block 118 is every 1 minute and the period of block 120 is every 2 minutes. It is further appreciated, that the period for a given block may be regular (e.g., every 1 minute) or may be irregular (e.g., every 1 minute during a first network condition, and every 2 minutes during a second network condition). In some implementations, one or more of block 118, 120, and 122 (or other operations described herein) may be non-periodic and may be triggered by some network or other event.

Although the flowchart of FIG. 2 shows a specific order of performance, it is appreciated that this order may be rearranged into another suitable order, may be executed concurrently or with partial concurrence, or a combination thereof. Likewise, suitable additional and/or comparable operations may be added to method 116 or other methods described herein in order to achieve the same or comparable functionality. In some implementations, one or more operations are omitted. For example, in some implementations, block 122 of actually transmitting a frame to clear the medium can be omitted from method 116 or performed by a different device, such as another AP 108 or wireless node. It is appreciated that blocks corresponding to additional or alternative functionality of other implementations described herein can be incorporated in method 116. For example, blocks corresponding to the functionality of various aspects of implementations otherwise described herein can be incorporated in method 116 even if such functionality is not explicitly characterized herein as a block in method 116.

Figure 3:
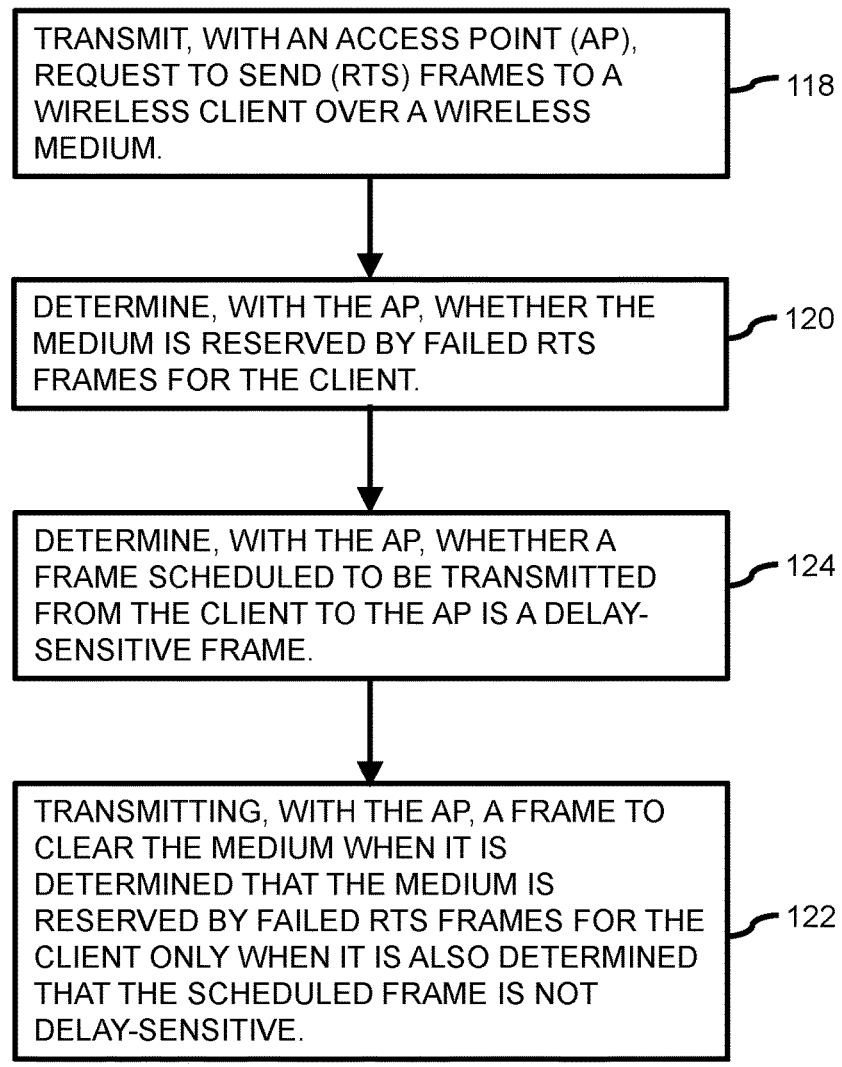
FIG. 3 is a flowchart for a method, according to another example.

FIG. 3 illustrates another example of method 116 in accordance with the present disclosure. For illustration, FIG. 3 reproduces various blocks from method 116 of FIG. 2, however it is appreciated that method 116 of FIG. 3 can include additional, alternative, or fewer operations, functionality, etc., than method 116 of FIG. 3 and is not intended to be limited by the diagram of FIG. 1 (or vice versa) or the related disclosure thereof. It is further appreciated that method 116 of FIG. 2 can incorporate one or more aspects of method 116 of FIG. 3 and vice versa. For example, in some implementations, method 116 of FIG. 2 can include the additional operation described below with respect to method 116 of FIG. 3.

Method 116 of FIG. 3 includes determining (at block 124), with AP 108, whether a frame scheduled to be transmitted from AP 108 to client 110 is delay-sensitive. The determination of block 124 can, for example, be based on a Quality of Experience assigned to the frame. As used herein, the term "Quality of Experience" and "QoE" can, for example, refer to a measure of a client's experiences with a service. Such a QoE can, for example, be based on the achievement of one or more quality-of-service ("QoS") metrics. Such, QoS metrics can, for example, refer to acceptable bandwidths, latencies, error rates, jitter rates, and the like. QoE and QoS can, for example, be implemented to help ensure a quality experience when using delay-sensitive network services, such as real-time multimedia services including certain Internet Protocol television (IPTV), video calls, online gaming, security camera streams, Voice over IP (VoIP) traffic, or other services. In some implementations, AP 108 determines that the scheduled frame is a delay-sensitive frame because the frame is a voice or video frame. In some implementations, AP 108 determines that the scheduled frame is not a delay-sensitive frame because the frame is a background or best effort frame.

Method 116 of FIG. 3 includes transmitting (at block 122), with AP 108, the frame to clear the medium when it is determined that the medium is reserved by failed RTS frames for client 110 only when it is also determined that the scheduled frame is not delay-sensitive. It is appreciated that block 122 of method 116 of FIG. 3 can include one or more aspects of block 122 of method 116 of FIG. 2 or vice versa. For example, in some implementations, a frame to clear the medium is a frame to clear a Network Allocation Vector (NAV) set by the client to reserve the medium.

Various example implementations for the present disclosure will now be described. It is appreciated that these examples may include or refer to certain aspects of other implementations described herein (and vice-versa), but are not intended to be limiting towards other implementations described herein. Moreover, it is appreciated that certain aspects of these implementations may be applied to other implementations described herein.

Certain implementations of the present disclosure may provide much finer control over the number of RTS frames that are retried by AP 108 compared to the use of a default value (e.g., 7-8 retries). Certain implementations of the present disclosure will allow the medium to be kept open for clients 110 and APs 108 to contend for only lower priority frames that are not delay sensitive. As provided above, an AP 108 may continuously send RTS frames with each having a NAV of approximately approx 4000 μs. This may cause interruption for other clients trying to receive or send frames. RTS frames may be sent at intervals of 1000 μs. In some situations, RTS frames may be sent after a Short Interframe Space (SIFS) interval (e.g., 16 μs in IEEE 802.11a) for retrying a frame and based on specified retry intervals (e.g., 7 or 8 by default). In live deployments, data frames may be approximately 512 bytes and it may take 306 μs to send the data frame over the air shown by the following calculation when using a 6 Mbps rate: Total time=RTS+ SIFS+CTS+SIFS+DATA+SIFS+ACK=47 μs+16 μs+39 μs+16 μs+133 μs+16 μs+39 μs=306 μs In this scenario, if a CTS sent by AP 108 is not responded by client 110, then the time wasted on the medium equals the NAV set by the RTS which is 306 μs-47 μs-16 μs, or 243 μs. If client 110 does not respond with a CTS, an AP 108 operating in accordance with certain implementations of the present disclosure can attempt to clear the medium by sending a CTS-to-self with a lowest possible duration or with a CF-End frame. This can, for example, clear the NAV set by the clients to allow for more fair contention by AP 108 as well as the clients 110 if a frame is not transmitted.

An AP operating in accordance with certain implementations of the present disclosure may arrive at a solution according to the following equation: Solution total time=RTS+SIFS+1 slot time (e.g., to detect a late incoming CTS)+CTS_to_self or CF-end=47 μs+16 μs+1 μs+39 μs=103 μs. The use of certain implementations of the present disclosure may result in a significantly faster solution compared to the alternative technique described above. In a "worst case" example, where three consecutive NAV frames of 4,000 μs are used, the medium may be reserved for 12,000 μs according to the alternative technique. In contrast, using certain implementations of the present disclosure, the medium will be reserved for only 103 μs, thereby saving 99.14% of airtime will be saved compared to the alternative technique. In a more common example, the medium may be reserved for 243 μs according to the alternative technique. In contrast, using certain implementations of the present disclosure, the medium will be reserved for only 103 μs, thereby saving 57.61% of airtime will be saved compared to the alternative technique.

As described above with respect to block 124 of FIG. 3, a further enhancement based on traffic awareness can also be incorporated by looking up the queue in which the packet is scheduled. For example, for a packet scheduled in a voice or video queue, a network administrator may not want to delay sending it and so may want RTS to be re-tried, whereas for packets scheduled in background or best effort, it may be desirable to allow other stations to contend for the medium along with AP 108. Such an enhancement may provide additional benefits as traffic in voice and video queues may be relatively smaller in size (e.g., up to 256 bytes) compared to traffic in background and best effort questions, which may be relatively larger in size (e.g., up to 1500 bytes).

Figure 4:
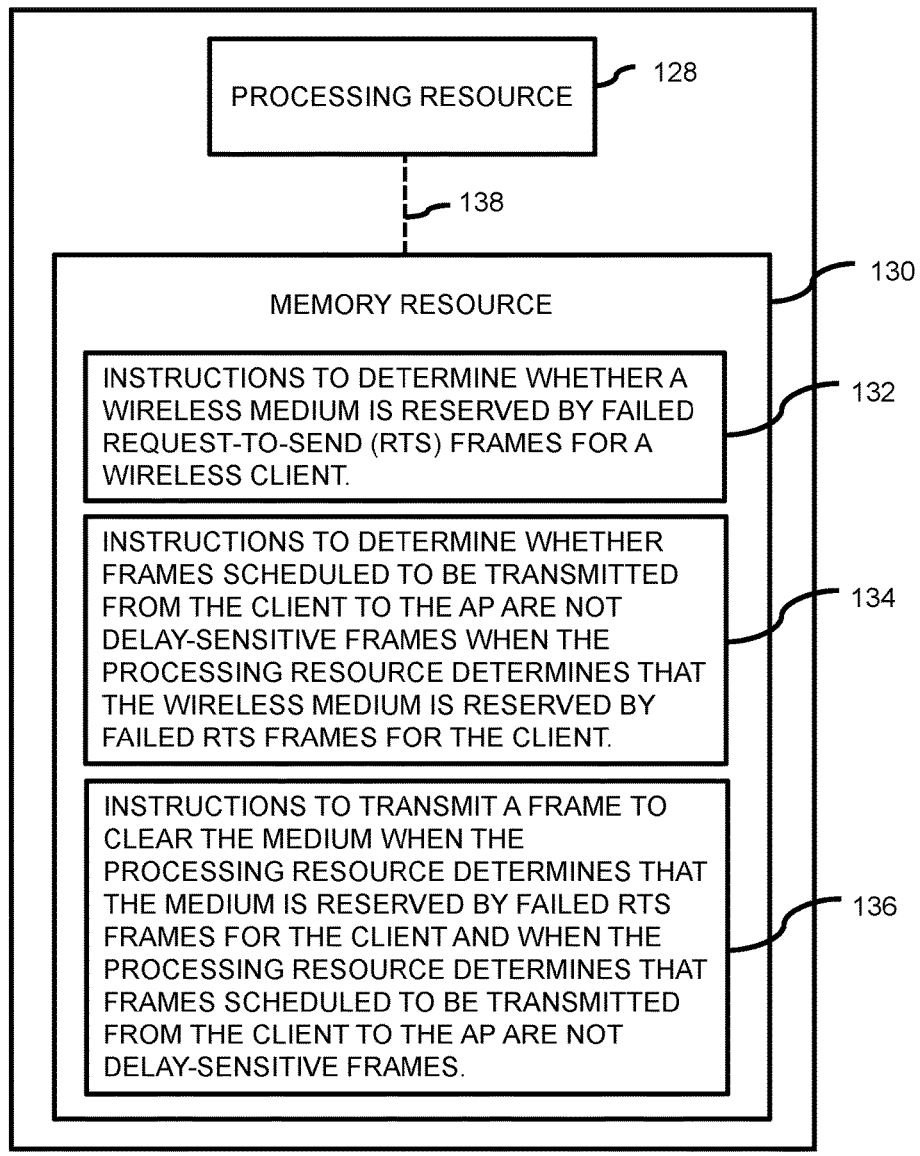
FIG. 4 is a diagram of a computing device, according to an example.

FIG. 4 is a diagram of a computing device 126 in accordance with the present disclosure. Computing device 126 can, for example, be in the form of an AP (e.g., AP 108), a wireless controller (e.g., wireless controller 104), or another suitable computing device within network environment 100 or in communication with network environment 100 or equipment thereof. In some implementations, the computing device can be a wireless controller 104 integrated in AP 108. In some implementations, computing device 126 is a wireless controller device (e.g., wireless controller 104) that is separate from AP 108. As described in further detail below, computing device 126 includes a processing resource 128 and a memory resource 130 that stores machine-readable instructions 132, 134, and 136. For illustration, the description of computing device 126 makes reference to various aspects of the diagram of FIG. 1 as well as method 116 of FIGS. 2 and 3. However it is appreciated that computing device 126 can include additional, alternative, or fewer aspects, functionality, etc., than the implementations described elsewhere herein and is not intended to be limited by the related disclosure thereof.

Instructions 132 stored on memory resource 130 are, when executed by processing resource 128, to cause processing resource 128 to determine whether a wireless medium is reserved by failed RTS frames for wireless client 110. Instructions 132 can incorporate one or more aspects of blocks of method 116 or another suitable aspect of other implementations described herein (and vice versa). For example, in some implementations, in some implementations, the medium can be determined to be reserved by repeated failed RTS frames because client 110 does not respond to multiple consecutive RTS frames.

Instructions 134 stored on memory resource 130 are, when executed by processing resource 128, to determine whether frames scheduled to be transmitted from client 110 to AP 108 are not delay-sensitive frames when processing resource 128 determines that the wireless medium is reserved by failed RTS frames for client 110. Instructions 134 can incorporate one or more aspects of blocks of method 116 or another suitable aspect of other implementations described herein (and vice versa). For example, in some implementations, instructions 134 are to determine that the scheduled frame is a delay-sensitive frame because the frame is a voice or video frame and determines that the scheduled frame is not a delay-sensitive frame because the frame is a background or best effort frame.

Instructions 136 stored on memory resource 130 are, when executed by processing resource 128, to transmit a frame to clear the medium when processing resource 128 determines that the medium is reserved by failed RTS frames for the client and when processing resource 128 determines that frames scheduled to be transmitted from client 110 to AP 108 are not delay-sensitive frames. Instructions 136 can incorporate one or more aspects of blocks of method 116 or another suitable aspect of other implementations described herein (and vice versa). For example, in some implementations, In some implementations, the frame to clear the medium is a frame to clear a NAV set by client 110 to reserve the medium.

Processing resource 128 of computing device 126 can, for example, be in the form of a central processing unit (CPU), a semiconductor-based microprocessor, a digital signal processor (DSP) such as a digital image processing unit, other hardware devices or processing elements suitable to retrieve and execute instructions stored in memory resource 130, or suitable combinations thereof. Processing resource 128 can, for example, include single or multiple cores on a chip, multiple cores across multiple chips, multiple cores across multiple devices, or suitable combinations thereof. Processing resource 128 can be functional to fetch, decode, and execute instructions as described herein. As an alternative or in addition to retrieving and executing instructions, processing resource 128 can, for example, include at least one integrated circuit (IC), other control logic, other electronic circuits, or suitable combination thereof that include a number of electronic components for performing the functionality of instructions stored on memory resource 130. The term "logic" can, in some implementations, be an alternative or additional processing resource to perform a particular action and/or function, etc., described herein, which includes hardware, e.g., various forms of transistor logic, application specific integrated circuits (ASICs), etc., as opposed to machine executable instructions, e.g., software firmware, etc., stored in memory and executable by a processor. Processing resource 128 can, for example, be implemented across multiple processing units and instructions may be implemented by different processing units in different areas of computing device 126.

Memory resource 130 of computing device 126 can, for example, be in the form of a non-transitory machine-readable storage medium, such as a suitable electronic, magnetic, optical, or other physical storage apparatus to contain or store information such as machine-readable instructions 132, 134, and 136. Such instructions can be operative to perform one or more functions described herein, such as those described herein with respect to method 116 or other methods described herein. Memory resource 130 can, for example, be housed within the same housing as processing resource 128 for computing device 126, such as within a computing tower case for computing device 126 (in implementations where computing device 126 is housed within a computing tower case). In some implementations, memory resource 130 and processing resource 128 are housed in different housings. As used herein, the term "machine-readable storage medium" can, for example, include Random Access Memory (RAM), flash memory, a storage drive (e.g., a hard disk), any type of storage disc (e.g., a Compact Disc Read Only Memory (CD-ROM), any other type of compact disc, a DVD, etc.), and the like, or a combination thereof. In some implementations, memory resource 130 can correspond to a memory including a main memory, such as a Random Access Memory (RAM), where software may reside during runtime, and a secondary memory. The secondary memory can, for example, include a nonvolatile memory where a copy of machine-readable instructions are stored. It is appreciated that both machine-readable instructions as well as related data can be stored on memory mediums and that multiple mediums can be treated as a single medium for purposes of description.

Memory resource 130 can be in communication with processing resource 128 via a communication link 138. Each communication link 138 can be local or remote to a machine (e.g., a computing device) associated with processing resource 128. Examples of a local communication link 138 can include an electronic bus internal to a machine (e.g., a computing device) where memory resource 130 is one of volatile, non-volatile, fixed, and/or removable storage medium in communication with processing resource 128 via the electronic bus.

In some implementations, one or more aspects of computing device 126 (e.g., AP 108, wireless controller 104, or other devices of a wireless network) can be in the form of functional modules that can, for example, be operative to execute one or more processes of instructions 132, 134, or 136 or other functions described herein relating to other implementations of the disclosure. As used herein, the term "module" refers to a combination of hardware (e.g., a processor such as an integrated circuit or other circuitry) and software (e.g., machine- or processor-executable instructions, commands, or code such as firmware, programming, or object code). A combination of hardware and software can include hardware only (i.e., a hardware element with no software elements), software hosted at hardware (e.g., software that is stored at a memory and executed or interpreted at a processor), or hardware and software hosted at hardware. It is further appreciated that the term "module" is additionally intended to refer to one or more modules or a combination of modules. Each module of computing device 126 can, for example, include one or more machine-readable storage mediums and one or more computer processors.

In view of the above, it is appreciated that the various instructions of computing device 126 described above can correspond to separate and/or combined functional modules. For example, instructions 136 can correspond to a "medium clearing module" (e.g., module 112 of FIG. 1) to transmit a frame to clear the medium when processing resource 128 determines that the medium is reserved by failed RTS frames for client 110 and when processing resource 128 determines that frames scheduled to be transmitted from client 110 to AP 108 are not delay-sensitive frames. Likewise, instructions 132 can correspond to a medium reservation determination module to determine whether the medium is reserved by failed RTS frames for client 110. It is further appreciated that a given module can be used for multiple functions. As but one example, in some implementations, a single module can be used to both determine whether the medium is reserved as well as to transmit the frame to clear the medium.

One or more nodes within the network environment 100 (e.g., wireless controller 104, AP 108, etc.) can further include a suitable communication module to allow networked communication between network equipment. Such a communication module can, for example, include a network interface controller having an Ethernet port and/or a Fibre Channel port. In some implementations, such a communication module can include wired or wireless communication interface, and can, in some implementations, provide for virtual network ports. In some implementations, such a communication module includes hardware in the form of a hard drive, related firmware, and other software for allowing the hard drive to operatively communicate with other hardware of wireless controller 104, AP 108, or other network equipment. The communication module can, for example, include machine-readable instructions for use with communication the communication module, such as firmware for implementing physical or virtual network ports.

Figure 5:
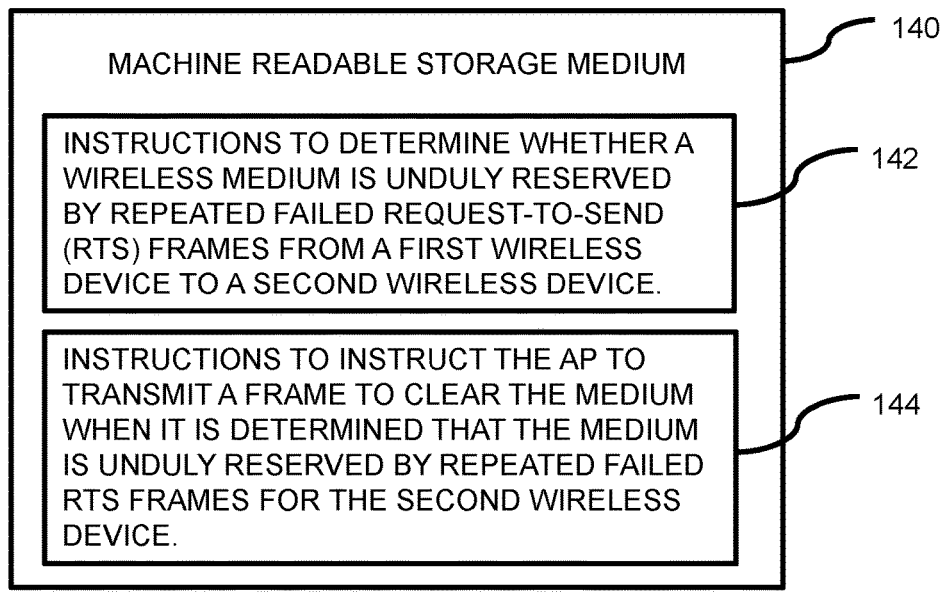
FIG. 5 is a diagram of machine-readable storage medium, according to an example.

FIG. 5 illustrates a machine-readable storage medium 140 including various instructions that can be executed by a computer processor or other processing resource. In some implementations, medium 140 can be housed within an AP, such as AP 108, a wireless controller, such as wireless controller 104, or on another computing device within network environment 100 or in local or remote wired or wireless data communication with network environment 100. For illustration, the description of machine-readable storage medium 140 provided herein makes reference to various aspects of computing device 126 (e.g., processing resource 128) and other implementations of the disclosure (e.g., method 116). Although one or more aspects of computing device 126 (as well as instructions such as instructions 132, 134, and 136) can be applied to or otherwise incorporated with medium 140, it is appreciated that in some implementations, medium 140 may be stored or housed separately from such a system. For example, in some implementations, medium 140 can be in the form of Random Access Memory (RAM), flash memory, a storage drive (e.g., a hard disk), any type of storage disc (e.g., a Compact Disc Read Only Memory (CD-ROM), any other type of compact disc, a DVD, etc.), and the like, or a combination thereof.

Medium 140 includes machine-readable instructions 142 stored thereon to cause processing resource 128 to determine whether a wireless medium is unduly reserved by repeated failed RTS frames from a first wireless device to a second wireless device. Instructions 142 can, for example, incorporate one or more aspects of block 120 of method 116 or another suitable aspect of other implementations described herein (and vice versa). For example, in some implementations, the first wireless device is in the form of an AP (e.g., AP 108) and second wireless device is in the form of a wireless client (e.g., wireless client 110), such as a mobile device, tablet, laptop, etc. It is appreciated, however, that in some implementations, the first wireless device may be in the form of a wireless client and the second wireless device may be in the form of an AP, whereas in some implementations, both first and second wireless devices are both in the form of wireless clients or both in the form of APs.

As used herein, the term "unduly reserved" can, for example, refer to situations in which RTS frames are being repeatedly re-tried because a network device does not respond to multiple consecutive RTS frames. In some implementations, the number of consecutive RTS frames that may trigger a determination that a medium is "unduly reserved" may be 4, 8, or any other suitable number. It is appreciated that instructions 142 may determine whether a wireless medium is unduly reserved based on other suitable criteria.

Medium 140 includes machine-readable instructions 144 stored thereon to cause processing resource 128 to instruct AP 108 to transmit a frame to clear the medium when it is determined that the medium is unduly reserved by repeated failed RTS frames for the second wireless device. Instructions 144 can, for example, incorporate one or more aspects of block 122 of method 116 or another suitable aspect of other implementations described herein (and vice versa). For example, in some implementations, instructions 144 are to cause processor resource 128 to determine that the wireless medium is unduly reserved by repeated failed RTS frames when client 110 does not respond to multiple consecutive RTS frames.

While certain implementations have been shown and described above, various changes in form and details may be made. For example, some features that have been described in relation to one implementation and/or process can be related to other implementations. In other words, processes, features, components, and/or properties described in relation to one implementation can be useful in other implementations. Furthermore, it should be appreciated that the systems and methods described herein can include various combinations and/or sub-combinations of the components and/or features of the different implementations described. Thus, features described with reference to one or more implementations can be combined with other implementations described herein.

As used herein, "logic" is an alternative or additional processing resource to perform a particular action and/or function, etc., described herein, which includes hardware, e.g., various forms of transistor logic, application specific integrated circuits (ASICs), etc., as opposed to machine executable instructions, e.g., software firmware, etc., stored in memory and executable by a processor. Further, as used herein, "a" or "a number of" something can refer to one or more such things. For example, "a number of widgets" can refer to one or more widgets. Also, as used herein, "a plurality of" something can refer to more than one of such things.

What is claimed is:

1. A method comprising:
   transmitting, with an Access Point (AP), Request to Send (RTS) frames to a wireless client over a wireless medium;
   determining, with the AP, whether the medium is reserved by failed RTS frames for the client;
   determining, with the AP, whether a frame scheduled to be transmitted from the AP to the client is a delay-sensitive frame; and
   transmitting, with the AP, a frame to clear the medium when it is determined that the medium is reserved by failed RTS frames for the client and only when it is also determined that the scheduled frame is not delay-sensitive,
   wherein the AP determines that the scheduled frame is not a delay-sensitive frame because the frame is a background or best effort frame.

2. The method of claim 1, wherein the frame to clear the medium is a frame to clear a Network Allocation Vector (NAV) set by the client to reserve the medium.

3. The method of claim 1, wherein the frame to clear the medium is a CTS-to-self frame with a minimum duration.

4. The method of claim 3, wherein the minimum duration is 0.

5. The method of claim 1, wherein the frame to clear the medium is a Contention Free (CF)-End frame.

6. The method of claim 1, wherein the medium is reserved by failed RTS frames for the client due to the client being non-responsive.

7. The method of claim 1, wherein the medium is reserved by failed RTS frames for the client due to the client being non-responsive because the client is scanning off-channel.

8. The method of claim 1, wherein the AP determines that the medium is reserved by failed RTS frames for the client because the client has not responded within a predetermined period of time.

9. The method of claim 1, wherein the AP determines that the scheduled frame is a delay-sensitive frame because the frame is a voice or video frame.

10. A non-transitory machine readable storage medium having stored thereon machine readable instructions to cause a computer processor to:
    determine whether a wireless medium is unduly reserved by repeated failed Request-to-Send (RTS) frames from a first wireless device to a second wireless device;
    determine whether a frame scheduled to be transmitted from the first wireless device to the second wireless device is a delay-sensitive frame; and
    instruct the first wireless device to transmit a frame to clear the medium when it is determined that the medium is unduly reserved by repeated failed RTS frames for the second wireless device and only when it is also determined that the scheduled frame is not delay-sensitive,
    wherein the scheduled frame is not a delay-sensitive frame because the frame is a background or best effort frame.

11. The medium of claim 10, wherein the instructions are to cause the computer processor to determine that the wireless medium is unduly reserved by repeated failed RTS frames because the second wireless device does not respond to multiple consecutive RTS frames.

12. The medium of claim 10, wherein the frame to clear the medium is a frame to clear a Network Allocation Vector (NAV) set by the client to reserve the medium.

13. The medium of claim 10, wherein the frame to clear the medium is a CTS-to-self frame with a minimum duration.

14. The medium of claim 13, wherein the minimum duration is 0.

15. The medium of claim 10, wherein the frame to clear the medium is a Contention Free (CF)-End frame.

16. The medium of claim 10, wherein the scheduled frame is a delay-sensitive frame because the frame is a voice or video frame.

17. A method comprising:
  transmitting, with an Access Point (AP), Request to Send (RTS) frames to a wireless client over a wireless medium;
  determining, with the AP, whether the medium is reserved by failed RTS frames for the client; and
  transmitting, with the AP, a frame to clear the medium when it is determined that the medium is reserved by failed RTS frames for the client,
    wherein the medium is reserved by failed RTS frames for the client due to the client being non-responsive because the client is scanning off-channel.

18. The method of claim 17, wherein the frame to clear the medium is a frame to clear a Network Allocation Vector (NAV) set by the client to reserve the medium.

19. The method of claim 17, wherein the frame to clear the medium is a CTS-to-self frame with a minimum duration.

20. The method of claim 17, wherein the frame to clear the medium is a Contention Free (CF)-End frame.

* * * * *